United States Patent [19]

McConnell

[11] Patent Number: 5,204,879
[45] Date of Patent: Apr. 20, 1993

[54] HIGH SPEED DATA DETECTION AND CLOCK RECOVERY IN A RECEIVED MULTI-LEVEL DATA SIGNAL

[75] Inventor: Peter R. H. McConnell, Burnaby, Canada

[73] Assignee: Motorola, Inc., Schaumburg, Ill.

[21] Appl. No.: 648,065

[22] Filed: Jan. 31, 1991

[51] Int. Cl.$^5$ ............................................. H04L 25/49
[52] U.S. Cl. ......................................... 375/20; 375/89
[58] Field of Search ..................... 375/20, 89, 12, 14, 375/114, 116, 106; 341/56

[56] References Cited

U.S. PATENT DOCUMENTS 4,984,249  1/1991  Long et al. ..................... 375/116 X Primary Examiner—Curtis Kuntz
Assistant Examiner—Tesfaldet Bocure
Attorney, Agent, or Firm—Donald B. Southard

[57] ABSTRACT

An arrangement for high speed data detection and clock recovery in a multi-level data signal is disclosed wherein the received signal wavform is sampled at periodic preselected locations and the samples so obtained are compared to set values representing the expected levels at those locations. In within a permitted tolerance range over a given window of time, an indication of the presence of data is determined. Futher, if such correlation is determined to occur at a periodic rate, symbol-timing (clock) recovery is also indicated. A further embodiment with a dual recovery capability is also disclosed and described.

12 Claims, 3 Drawing Sheets

HIGH SPEED DATA DETECTION AND CLOCK RECOVERY IN A RECEIVED MULTI-LEVEL DATA SIGNAL

FIELD OF THE INVENTION

The present invention relates generally to radio data communication systems and, more particularly, to a fast data detect arrangement as well as symbol timing (clock) recovery for a multi-level data signal processed in such radio data communication systems.

BACKGROUND OF THE INVENTION

Present day radio data communication systems typically include a centrally located base station or central controller coupled to a host computer, which base or central controlled communicates to a plurality of system remote data terminal units over an outbound communication channel. Conversely, the system remote data terminal units communicate to the central site over a separate inbound channel.

Usually such communication is effected from the remote data terminal side in essentially pseudo-automatic fashion. That is, the user/radio operator merely attempts to access the communication channel and transmit data by pushing a button on the terminal itself. If the channel is clear, the terminal unit commences to transmit upon activation of the push to talk button. If the channel is determined in use, the initiating radio terminal unit tries again some other time, usually on a random basis. Provision is made to, for the most part, avoid destructive collisions that would otherwise occur when more than one radio data terminal attempts to transmit on a communication channel simultaneously. This avoidance is effected mainly by the establishment and use of a suitable operating protocol which in essence determines the radio traffic rules for such system.

An early innovation in the radio data communication requires the central station or controller to insert "busy bits" in the traffic forming the outbound channel message stream and, in this manner, advise any of the radio data terminal units that in fact the inbound channel is in use as indicated by the mere presence of the "busy bits".

Accordingly, in such radio data communication systems, it is obviously an objective to quickly identify the presence of data as well as to effect symbol timing (clock) recovery in a minimum amount of time. These factors directly impact the "throughput" or observable efficiency of the radio data communication system. In point of fact, the time required to detect the mere presence of data on the inbound channel constitutes a major contributor to the collision window. It will be appreciated that it is critical, to say the least, that the modem at the base station be able to detect data presence and then set the "busy bits" in the outbound message screen in the least amount of time. This optimization of the collision window obviously permits higher channel throughput, in an essentially exponential relationship. In optimizing this collision window, there are at least two major considerations, namely: 1) fast detect of the presence of a specific baseband modulation as well as 2) the detection of the symbol timing center of the received waveforms.

SUMMARY OF THE INVENTION

In a radio data communication system operating with an established protocol and processing multi-level data signal information, a provision is made to receive such multi-level data signal wave forms and sample at a plurality of preselected locations on the received waveform to determine if the same is at a permitted level at each of said preselected locations. If in fact correlation is determined at a given number of successive permitted locations, then using and relying on the same to indicate the presence of data. Then further determining if such correlation utilized to detect the presence of data is occurring at a periodic rate, and if so, using and relying on such to determine the presence of symbol timing (clock) recovery.

BRIEF DESCRIPTION OF THE DRAWINGS

The novel features which are believed to be characteristic of the present invention are set forth with particularity in the appended claims. The invention itself, however, will be best understood by reference to the following description when taken in conjunction with the drawings, in which:

DESCRIPTION OF A PREFERRED EMBODIMENT

In a multi-level FSK modulation signaling information of the type contemplated for use in a radio data communication system here under consideration, certain pattern characteristics are readily evident. For example, a baseband eye pattern is shown graphically in FIG. 1 which indicates certain minimum level crossings at predetermined locations in the waveform. The baseband data has been arbitrarily scaled such that peak deviation represents $\pm 1.0$. Accordingly, these minimum level crossings may be expected at $+1.0$, $+0.333$, $-0.333$ and $-1.0$. As such, they may be considered as occurring at "valid" levels and, in point of fact, represent symbol centers. While here being described in terms of a 4-level FSK modulation, it is to be understood that the present invention is equally applicable to any modulation technique that results in symbol centers that occur at fixed points in time.

Figure 1:
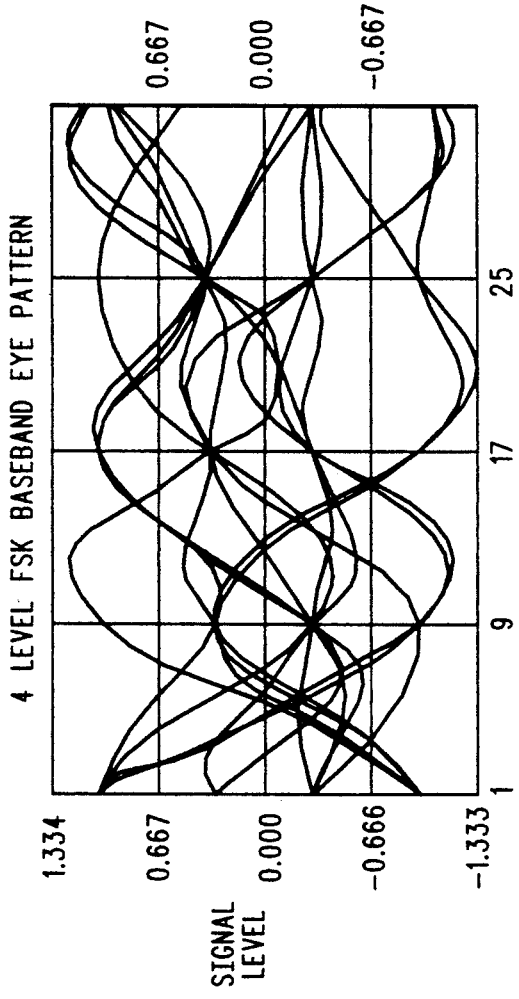
FIG. 1 is a graphic representation of the baseband eye pattern that may be expected in a multi-level FSK signal of a type used in the radio communication system that utilizes the present invention.

Returning to the example as set forth in FIG. 1, the baseband waveform that is received is shown as having the symbol centers (minimum crossing points) at essentially every 8 units of time along the horizontal axis and at essentially 4 levels of crossings. This then permits the sampling of such waveform at a sampling rate 8 times the symbol rate. Accordingly, a detection algorithm may then be utilized to examine every 8 sample, i.e., at sample points of 9, 17, 25, etc., over a window length of n-symbols. These symbols may then be compared with the valid levels previously determined to within some permitted tolerance range γ. If such comparison indicates that the sample level is within the allowed tolerance range with respect to the valid, or permitted levels, a score of 1.0 may be assigned for that sample, otherwise a score of zero (0) is applied. This comparison process is performed over the entire n-symbol length constraint, with respective scores at each of the successive symbol locations being cumulatively added. The resultant score may then be compared to some set number which is arbitrarily assigned to represent the minimally acceptable threshold level.

Figure 2:
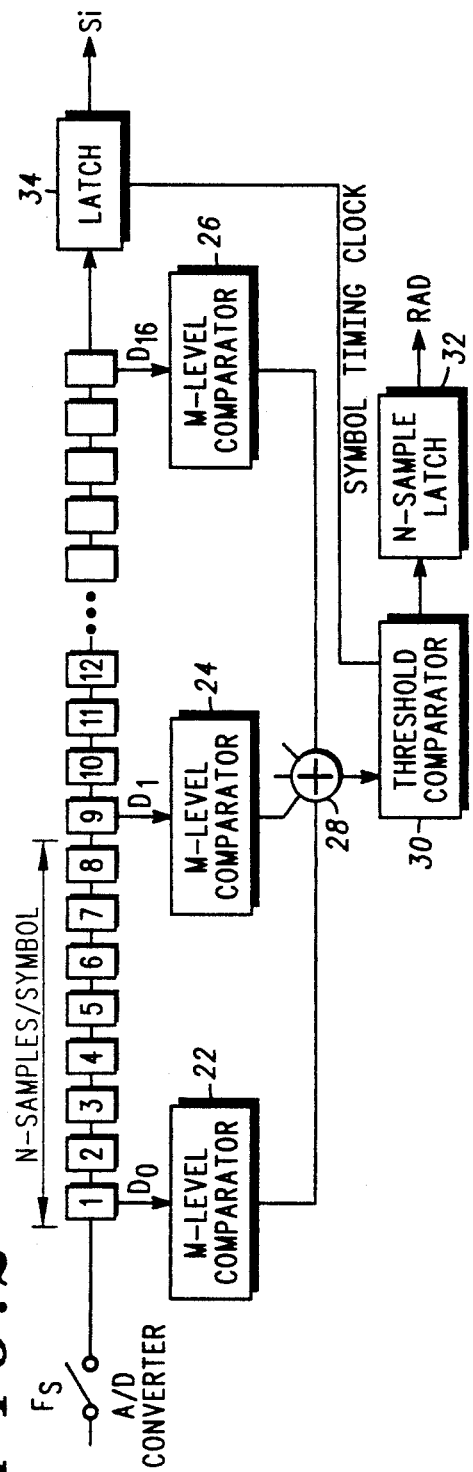
FIG. 2 is a block diagram of a fast data detect arrangement which may advantageously utilize the principles of the present invention.

The foregoing may advantageously be utilized in a generalized implementation of the present invention as set forth in FIG. 2, suitable for effecting fast data detection for many different modulation techniques, but certainly applicable to the illustrated 4-level FSK represented in FIG. 1. A raw analog data is then sampled at a rate of n-samples (8 in the example under consideration). The sample and data is then input to a tapped delay line as indicated generally at 20. The tapped delay line may be taken for illustrative purposes as having some 16 separate groups of samples, i.e., 16×8 samples. As further shown, the data line has a tap at selected locations—i.e., in this instance, at every 8th sample location. These tapped sample locations are identified at $D_0, D_1 \ldots D_{16}$. The digital data at each of these taps is then compared with "m" reference values, "m" in the present example being 4 as previously described in connection with FIG. 1.

An m-level hysteresis comparator is used in the referenced comparisons, shown generally in FIG. 2 as 22, 24 and 26. In the on-going comparison process, if the derived data samples are within a particular range, i.e., a permitted tolerance range, the output of the comparator will be set to produce a "1", otherwise it will be a zero (0). The outputs of the respective comparators 22, 24 . . . 26 are summed, in an adder 28, and the sum of the output thereof is compared to a predetermined threshold value set within an additional comparator 30. If the sum exceeds the set threshold value, the output of comparator 30 will again be a "1", otherwise it is zero (0). The output of comparator 30 is then latched at symbol centers (every 8th sample in the present example) and the latched output of latch 32 may be taken as the indicator that valid data has indeed been detected on the communication channel.

Such data detection is thereby effected within the window of 128 bits (16 taps×8 bits, in the example under consideration). This represents at least an order of magnitude in improvement, being at least one-tenth the time over that required for presently known conventional techniques. Moreover, it is quite possible that the data detect time factor may be reduced from the illustrated 16 symbol length even further, and in fact to as low as 10 symbols without appreciatable degradation in performance.

Figure 3:
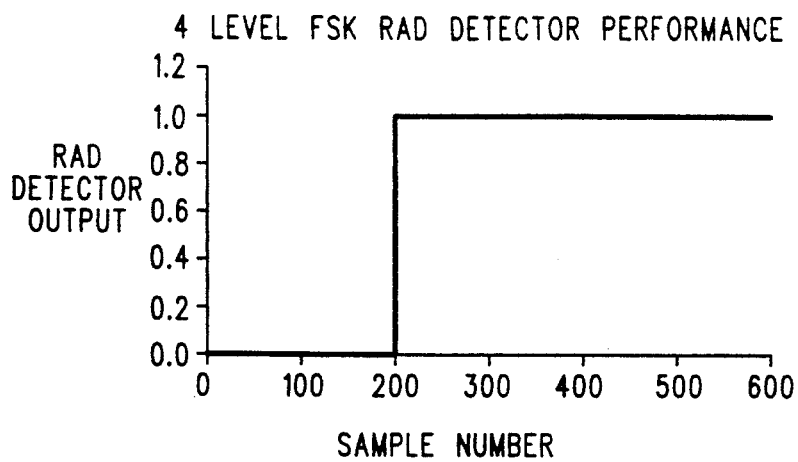
FIG. 3 is a graphic representation of the performance of the data detection arrangement that may be expected from the present invention.

For illustrative purposes, FIG. 3 shows the output of the data detect arrangement shown in FIG. 2 for the chosen 4-level FM modulation preceded by random noise. The analog data was sampled at the referenced 8 samples per symbol and the constraint length of the filter was the 16 symbol window, or some 128 samples. As previously mentioned, the 4-level hysteresis comparators looked for levels of +1.0, +0.333, −0.333, and −1.0 volts, tolerating an error of + or − on the order of 0.15 volts. The threshold comparator 30 at the output of adder 28 was set to go high when the input value was 75 percent of maximum, or in this case 12 out of the 16 symbol centers. Also, for this example, the modulated data was preceded by some 224 noise samples, and included 256 samples (32 symbols) of preamble and 1580 samples (196 symbols) of packet data. Because the data detector was implemented in a "look ahead" fashion, it was expected and indeed did assert a logic "1" level after some 200 samples.

Figure 4:
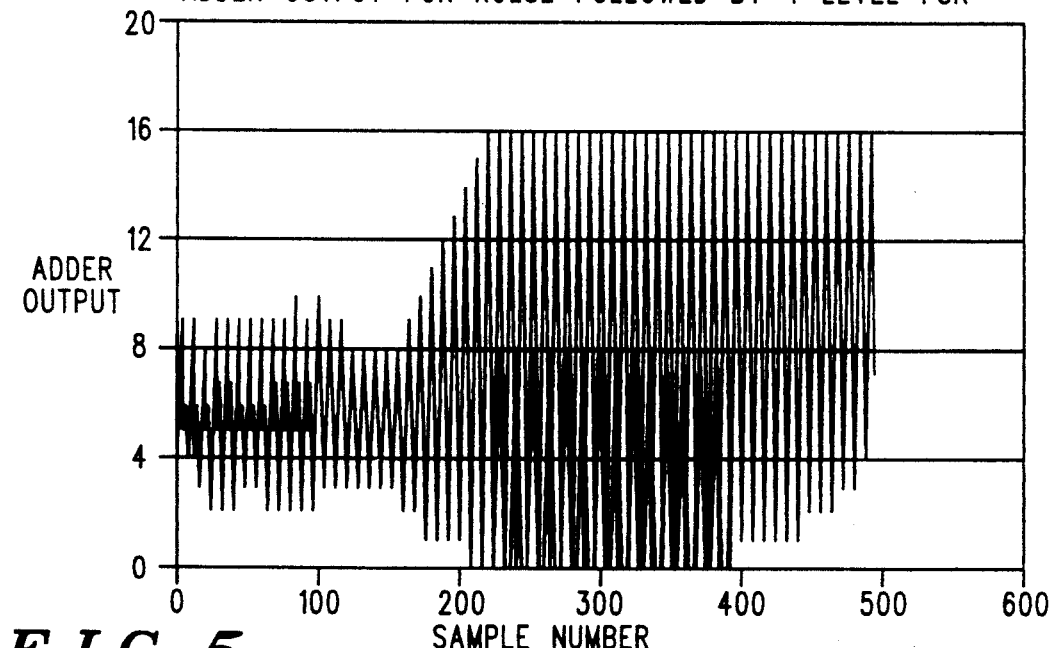
FIG. 4 is a graphic representation of the output of the adder of FIG. 2 for multi-level FSK modulation which show presence of data and timing recovery.

For timing (clock) recovery, the output of threshold comparator 30 may be taken as the indicator of symbol timing (clock), which, as referenced, is used to clock symbols into a further latch 34. FIG. 4 shows the output of adder 28 in FIG. 2 for 4-level FSK modulation. Accordingly, the peaks correspond to symbol centers and constitute the symbol timing clock as referenced at output of comparator 30 in FIG. 2. The data used in this example has a baseband SNR of approximately 25 db.

Figure 5:
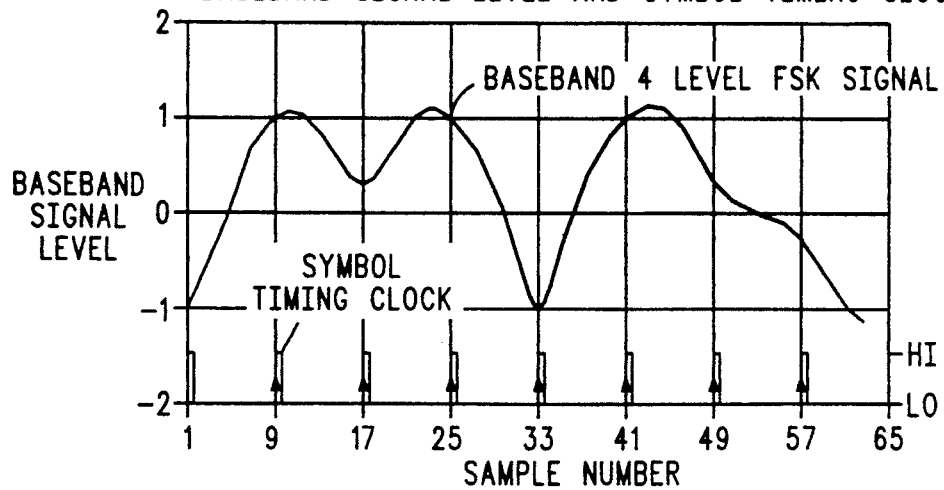
FIG. 5 is a graphic representation showing the relationship of the symbol timing clock edge and the baseband signal waveform.

The relationship between symbol timing clock and baseband signal waveform is shown in FIG. 5. As will be noted, the rising edge of the symbol timing clock effectively corresponds to symbols centers' locations. Accordingly, it will be appreciated that the means and methodology for the symbol timing recovery exhibits a very fast attack as well as a very fast decay, which is optimal for the desired rapid acquisition capability.

However, even with the foregoing, in mobile and portable communications environment, a received signal may well received may well experience noise, such as Rayleigh fading, which results in long periods where the baseband signal is so corrupted by such noise that the timing recovery method as above described cannot well maintain a constant symbol timing clock. This may well result in loss of symbol synchronization and even timing relative to the frame synchronization event.

Figure 6:
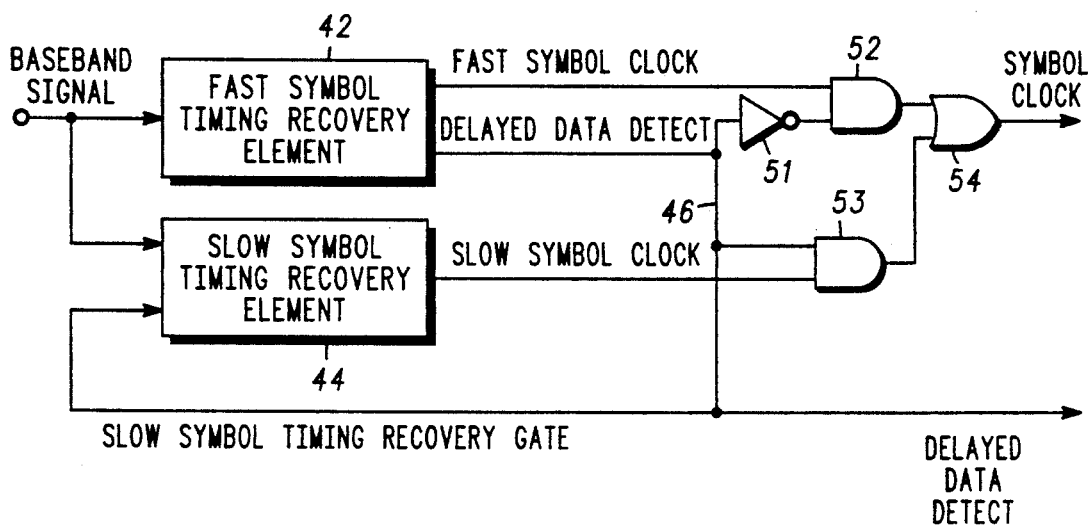
FIG. 6 is another embodiment of the present invention showing a dual mode symbol timing (clock) recovery arrangement utilizing the principles of the present invention.

To obviate this deleterious effect, a further embodiment of the present invention is shown in FIG. 6 providing a dual recovery capability. In this implementation, a fast symbol timing clock recovery arrangement is indicated generally at 42, which arrangement may be considered as that already described in connection with FIGS. 2, 4 and 5 and to that extent, constitutes the fast timing recovery phase of the overall dual timing recovery arrangement 40. The other phase, a slow symbol timing recovery with a relatively long time constant is shown generally at 44. The long time constant is effected to maintain the phase of the symbol timing clock through long noise bursts. Once symbol synchronization is effected by the described fast timing recovery arrangement 42, a logic element may be utilized to switch to the long time constant recovery 44.

The slow timing recovery may be conveniently implemented using a conventional narrow band filter (not specifically shown) with certain significant additions. First, the slow symbol timing recovery is gated, as shown being applied over the line connection 46. When the gate is low, slow timing recovery 44 remains disabled. The rising edge transition from the logic "0" to logic "1" initializes the slow recovery operation and will remain operative as long as the gate is held high.

Figure 7:
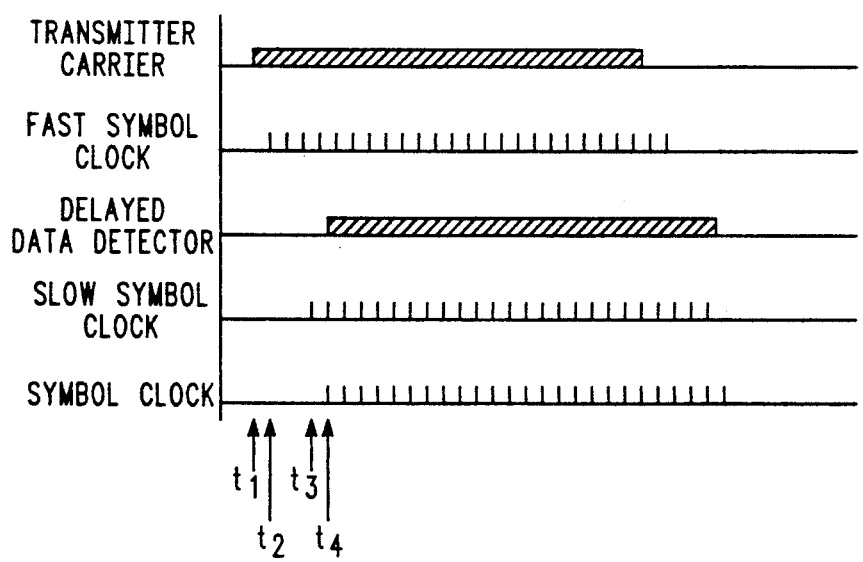
FIG. 7 is a timing guide diagram useful in the description of an understanding of the symbol timing (clock) recovery algorithm.

This slow timing recovery causes the filter elements (not shown) to be initialized with data representative of the baseband signal and in phase with the symbol timing clock. Logic elements 51, 52, 53 and 54 form a digital switch 50 based on the data detect output from the fast timing recovery 42 which selects the fast timing recovery clock signal if data detect is "0" and the slow timing recovery clock signal if delayed data detect is "1". The delayed data detect signal is used to switch between the two timing clock sources, and to initialize the slow timing recovery operation. The reason for the delayed data detect signal is that it is undesirable to switch to the slow timing recovery operation until it has time to acquire proper symbol timing recovery synchronization. The amount of delay required will depend primarily on the particular slow timing recovery implementation. A timing diagram for this is shown in FIG. 7. As therein shown, the transmit carrier represents the presence of the data bearing carrier on the radio channel starting at a time $t_1$. At a time $t_2$ later, the fast timing recovery 42 recovers the symbol timing clock. At a time $t_3$ later, the slow timing recovery 44 will start generating symbol timing clock pulses with the correct phase. At a time $t_4$ later, the delayed RAD signal will go high, causing the digital switch represented by 51–54 to switch from the fast symbol timing recovery clock to the slow symbol timing recovery clock data.

For a short time after the loss of a data bearing carrier, the fast delayed RAD signal will be held in the "1" state. Just prior this time, the occurrence of fast symbol timing recovery clock pulses will cease due to the lack of valid data. The slow timing recovery element will still be generating clock pulses because of the long delay time. When the delayed RAD signal goes to the "0" state, the digital switch 50 will select the fast symbol timing recovery pulse stream, for which there is no data present. Hence, the symbol clock pulse will then cease.

It will be appreciated that an important feature of the present invention is the capability of simultaneously looking for several modulation signal waveforms. An example of this would be a radio channel where 2 or 3 modulation techniques could be used and the base station is required to demodulate whichever is being used at a given time. The circuit as shown in FIG. 2, will easily be used to look for multiple modulation waveforms.

Further, it will also be noted that the implementation of the present invention may be effected in a number of media. That is, in software, to either run on a microprocessor or a digital signal processor, or in firmware, or even in hardware as a custom circuit design. In any event, whatever the implementation, it will be appreciated that the data detection and symbol timing recovery as herein disclosed provides both apparatus and method which will provide performance about ten times faster than that of presently known conventional means. The increase speed of the data detect provides an increased channel contention control efficiency for the radio data communications channel. The increase speed of the symbol timing recovery reduces the required length of the symbol timing recovery sequence preceding each packet in a radio channel, thus measurably increasing the radio channel protocol efficiency.

Accordingly, what is claimed is:

1. An arrangement for high speed data detection and clock recovery in a received multi-level data signal, including in combination:
   means for receiving a multi-level data signal;
   means for simultaneously sampling at a plurality of preselected locations on such received signal waveform comprising said multi-level data signal and determining if such samples are within a permitted range of an expected level at each of said preselected locations;
   data detect indicator means for indicating the presence of data whenever a given but presettable level of correlation is determined as occurring between said samples and the expected levels at a given number of successive said preselected locations; and
   further means for indicating the presence of clock recovery when determining said correlation is occurring at a periodic rate.

2. A high speed data detection and clock recovery arrangement in accordance with claim 1 wherein said means for determining if each of said samples are within a permitted tolerance range of an expected level includes an m-level comparator at each of said preselected locations for comparing the level of the signal samples with a set programmable value corresponding to said expected level.

3. A high speed data detection and clock recovery arrangement in accordance with claim 2 wherein each of said m-level comparators are coupled to adder means, and wherein said adder means is coupled to a threshold comparator wherein the presence of data is determined if the cumulative score received from said adder means is within an arbitrary value set to represent a minimally acceptable threshold level.

4. A high speed data detection and clock recovery arrangement in accordance with claim 1 wherein the means for simultaneously sampling at a plurality of preselected locations includes applying the received signal waveform to a tapped delay line having tap points at the desired sampling locations.

5. A high speed data detection and clock recovery arrangement in accordance with claim 1 wherein the multi-level data signal is a four level FSK modulation waveform, wherein the sampling rate is eight times the symbol rate, and the expected level at the respective preselected locations are $+1.0$, $+0.333$, $-0.333$ and $-1.0$ for a peak deviation set at a 1.0 level.

6. A method of effecting high speed data detection and clock recovery in a received multi-level data signal, including the steps of:
   receiving a multi-level data signal;
   simultaneously sampling at a plurality of preselected locations on such received signal waveform comprising said multi-level data signal and determining if such samples are within a permitted range of an expected level at each of said preselected locations; and
   indicating the presence of data whenever a given but presettable level of correlation occurs between said samples and the expected levels at a given number of said preselected locations; and
   indicating the presence of clock recovery whenever said correlation is determined as occurring at a periodic rate.

7. A method of high speed data detection and clock recovery in accordance with claim 6 wherein the step of determining if said samples are within a permitted tolerance range of an expected level includes comparing the sample at each of said preselected locations with a set programmable value corresponding to said expected level.

8. A method of high speed data detection and clock recovery in accordance with claim 6 wherein the step of simultaneously sampling at a plurality of preselected locations includes the further step of applying the received signal waveform to a tapped delay line having tap points at the desired sampling locations.

9. A symbol timing recovery arrangement, with dual recovery capability, for a received data bearing carrier containing multi-level signal information, including in combination:

means for receiving a multi-level data bearing carrier;

fast symbol timing recovery means which includes means for simultaneously sampling at a plurality of preselected locations on the received signal waveform comprising said multi-level data bearing carrier, determining if each of such samples are within a permitted range of an expected level at a given number of said successive preselected locations and, if so, determining whether such correlation is occurring at a periodic rate so as to denote the presence of symbol timing recovery;

slow symbol timing recovery means with a sufficiently long time constant to maintain the phase of the symbol timing clock thru long noise bursts; and logic means for initializing said fast symbol timing recovery means to acquire symbol timing recovery synchronization and then switching to said slow symbol timing recovery means which continues to operate for as long as a data bearing carrier is being received.

10. A symbol timing recovery arrangement in accordance with claim 9 wherein said slow symbol timing recovery means comprises gated narrow band filter means.

11. A symbol timing recovery arrangement in accordance with claim 10 wherein said slow symbol timing recovery means is disabled as long as the gate of said filter means receives a low level signal and is activated so long as said gate receives a high level signal.

12. A symbol timing recovery arrangement in accordance with claim 11 wherein the gating logic to said slow symbol timing recovery means is determined by a delayed data detect signal generated by said fast symbol timing recovery means.

* * * * *